United States Patent Office
3,360,559
Patented Dec. 26, 1967

3,360,559
SUBSTITUTED 1,3,4,10,11,12-HEXAHYDROXY-
NAPHTHACENE-2-CARBOXAMIDES
Jerry Robert Daniel McCormick, Spring Valley, and
Elmer Raymond Jensen, Nanuet, N.Y., assignors to
American Cyanamid Company, Stamford, Conn., a
corporation of Maine
No Drawing. Filed Nov. 30, 1964, Ser. No. 414,899
8 Claims. (Cl. 260—559)

ABSTRACT OF THE DISCLOSURE

This disclosure describes compounds of the class of substituted 1,3,4,10,11,12 - hexahydroxynaphthacene-2-carboxamides useful as intermediates in the synthesis of physiologically active antibiotics of the tetracycline series.

This invention relates to new organic compounds and, more particularly, is concerned with the 4-hydroxy derivatives of substituted 1,3,10,11,12-pentahydroxynaphthacene-2-carboxamides and to methods of preparing these novel compounds. The substituted 1,3,10,11,12-pentahydroxynaphthacene-2-carboxamides are described in the copending application of McCormick et al., Ser. No. 233,944, filed Oct. 29, 1962, now Patent No. 3,201,424. The novel compounds of the present invention may be represented by the following general formula:

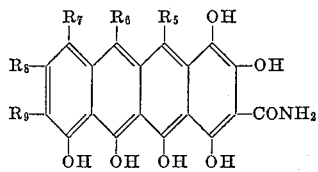

wherein $R_5$ is hydrogen or lower alkyl, $R_6$ is hydrogen or lower alkyl and $R_7$, $R_8$ and $R_9$ are each selected from the group consisting of hydrogen, halogen, hydroxy, lower alkoxy, lower alkyl, amino, mono(lower alkyl)amino, di(lower alkyl)amino, nitro, nitroso, thiocyano and mercapto. Lower alkyl and lower alkoxy groups contemplated by the present invention are those having from 1 to 6 carbon atoms. Halogen is exemplified by chlorine, bromine, iodine and fluorine.

A preferred embodiment of the present invention may be represented by the following general formula:

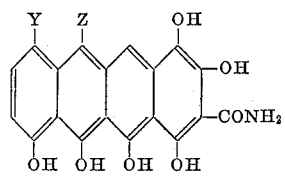

wherein Z is hydrogen or lower alkyl and Y is hydrogen, chlorine or bromine.

The novel compounds of the present invention are obtainable as crystalline materials having characteristic absorption spectra and high melting points. They are generally insoluble in water and most organic solvents.

The novel compounds of the present invention may be readily prepared in a variety of different ways. For example, the condensation of an appropriately substituted 3-hydroxy phthalic anhydride with an appropriately substituted 2-carboxamido-1,3,4-trihydroxynaphthalene gives rise either to an intermediate 6-hydroxynaphthacene-5,12-quinone or to an intermediate naphthacene-6,11-quinone as set forth in the following reaction scheme:

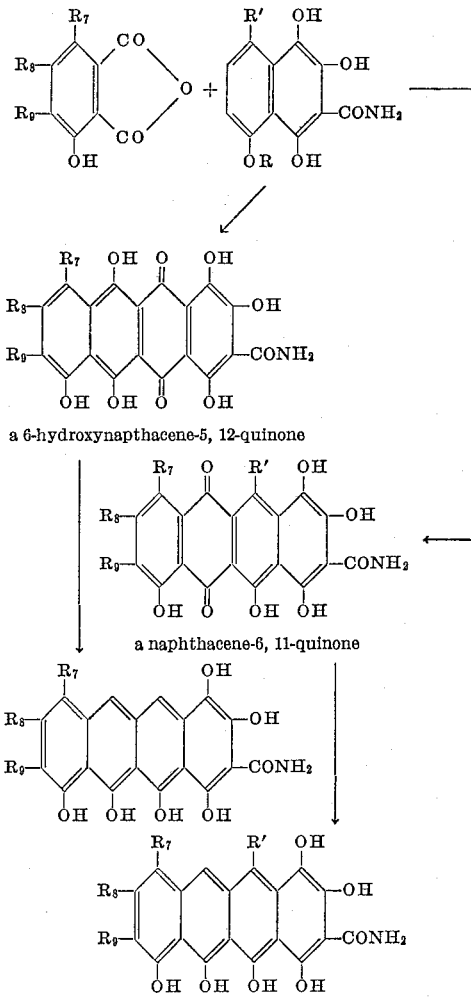

wherein $R_7$, $R_8$ and $R_9$ are as previously defined, and R is hydrogen or lower alkyl. When R' is hydroxy or lower alkoxy, then the intermediate 6-hydroxynaphthacene-5,12-quinone is obtained. When R' is hydrogen or lower alkyl, then the product is a naphthacene-6,11-quinone. This condensation is carried out under the general conditions of the Friedel-Crafts reaction employing, for example, boric anhydride, sulfuric acid, anhydrous aluminum chloride or anhydrous ferric chloride as catalyst. The condensation may be carried out in a high boiling inert solvent, or in a melt such as boric anhydride or the eutectic of sodium chloride and aluminum chloride at temperatures in excess of 100° C. Reduction of the resulting naphthacene-quinones to the corresponding 5,6-deoxygenated derivatives may be readily accomplished by any of several well-known procedures described in the chemical literature for the reduction of 1-hydroxyanthraquinones to the corresponding 9-anthrones. For example, this reduction may be accomplished with boiling hydriodic acid, with tin and hydrochloric acid, or by catalytic hydrogenation with a nickel or noble metal catalyst.

Some of the novel compounds of the present invention may also be prepared by the condensation of an appropriately substituted 3,7-dihydroxyphthalide with an appropriately substituted 1,3,4-trihydroxynaphthalene-2-carboxamide as set forth in the following reaction scheme:

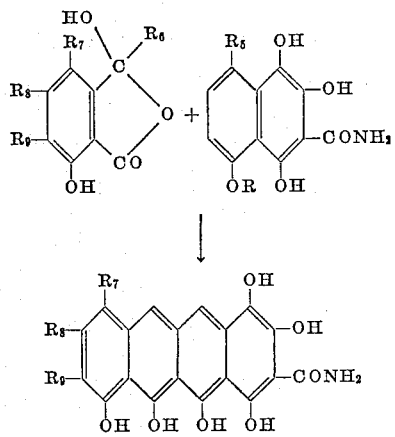

wherein $R_5$, $R_6$, $R_7$, $R_8$ and $R_9$ are as previously defined and R is hydrogen or lower alkyl. This condensation may also be carried out under the general conditions of the Friedel-Crafts reaction as described above for the condensation with 3-hydroxy phthalic anhydrides.

Certain of the novel compounds of the present invention may also be prepared by the condensation of an appropriately substituted naphthalene with 2-carboxamido-3,5,6-trihydroxy phthalic anhydride as set forth in the following reaction scheme:

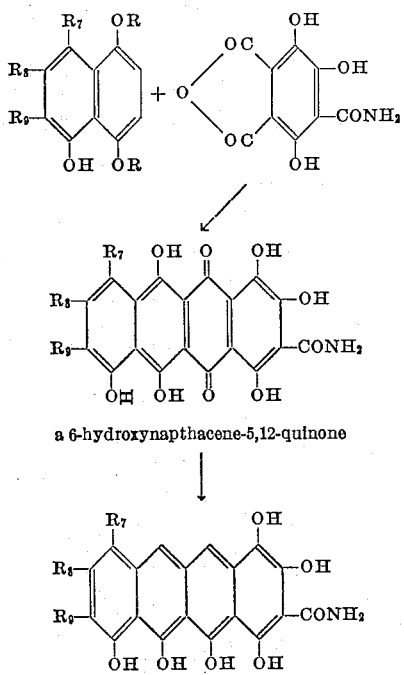

a 6-hydroxynapthacene-5,12-quinone wherein $R_7$, $R_8$ and $R_9$ are as previously defined and R is hydrogen or lower alkyl. This condensation may also be carried out under the general conditions of the Friedel-Crafts reaction as described above, and reduction of the intermediate 6-hydroxynaphthacene-5,12-quinones may also be accomplished as set forth above. In preparing the novel compounds of the present invention by the condensation reactions set forth above, it is to be understood that the substituted phthalic acids, esters, and acid halides are equivalent to the corresponding substituted phthalic anhydrides.

Certain of the novel compounds of the present invention may be prepared from an appropriately substituted tetracycline methyl betaine [J.A.C.S. 80, 1654–1657 (1958)] as set forth in the following reaction scheme:

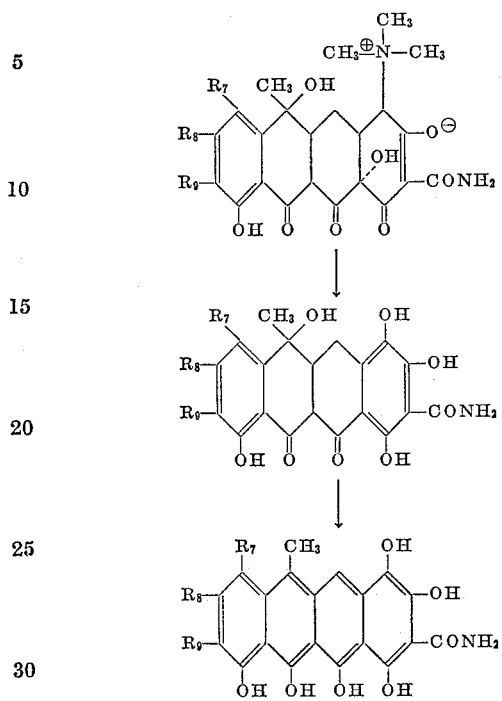

wherein $R_7$, $R_8$ and $R_9$ are as previously defined. The conversion of the tetracycline methyl betaine to the 4-dedimethylamino-4-hydroxy-4a,12a-anhydrotetracycline is carried out in refluxing acetonitrile under an atmosphere of nitrogen for 1½ to 2 hours. After this reaction is complete, the solvent is evaporated to dryness and the product is refluxed in a 30% solution of hydrobromic acid in acetic acid whereby the 1,3,4,10,11,12-hexahydroxynaphthacene-2-carboxamide is obtained.

The novel compounds of the present invention are useful as intermediates in the synthesis of physiologically active antibiotics of the tetracycline series. For example, the substituted 1,3,4,10,11,12-hexahydroxynaphthacene-2-carboxamides of the present invention may be biologically transformed to tetracyclines as set forth in the following reaction scheme:

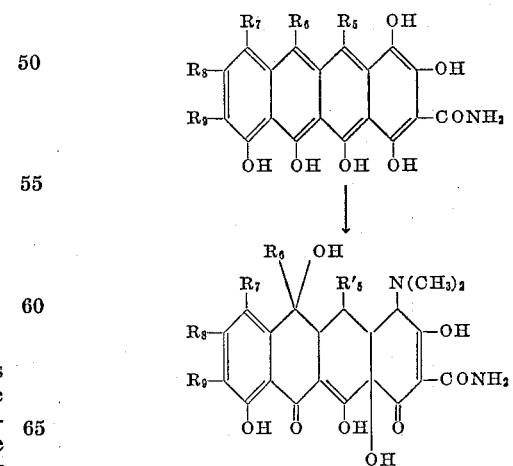

wherein $R_5$, $R_6$, $R_7$, $R_8$ and $R_9$ are as previously defined and $R'_5$ is hydrogen, hydroxy or lower alkyl. This transformation is accomplished by adding the novel compounds of the present invention to a fermentation medium inoculated with a strain of a species of the genus Streptomyces which species is capable of producing one of the tetracyclines. Certain other biological transformations may be accomplished simultaneously with the 5a,6- and 4a,12a-dihydration. Where $R_5$ in the above reaction scheme is hydrogen and a 5-hydroxylating species of the genus Streptomyces is employed, then a hydroxyl group is introduced at the 5-position. Where $R_5$ is lower alkyl, or where $R_5$ is hydrogen and a non 5-hydroxylating species of the genus Streptomyces is employed, then $R'_5$ is lower alkyl or hydrogen, respectively. Where $R_7$ in the above reaction scheme is a substituent other than hydrogen, then this substituent is retained at the 7-position regardless of the biological transformations occurring in the rest of the molecule. Where $R_7$ is hydrogen, and a non-halogenating strain of Streptomyces is employed, then $R_7$ is also hydrogen in the product. Where $R_7$ in the molecule is hydrogen, and a 7-halogenating strain of the genus Streptomyces is employed, then $R_7$ in the product is chlorine or bromine depending upon the conditions of the fermentation. Among the strains of S. aureofaciens which will introduce chlorine or bromine at the 7-position of the molecule, as well as accomplishing the 5a,6- and 4a,12a-dihydration, are the following:

S. aureofaciens

| | |
|---|---|
| ATCC 10762a | ATCC 12554 |
| ATCC 10762b | ATCC 13189 |
| ATCC 10762g | ATCC 13899 |
| ATCC 10762i | ATCC 13900 |
| ATCC 11989 | NRRL B-1286 |
| ATCC 12416b | NRRL B-1287 |
| ATCC 12416c | NRRL B-1288 |
| ATCC 12416d | NRRL B-2209 |
| ATCC 12551 | NRRL B-2406 |
| ATCC 12552 | NRRL B-2407 |
| ATCC 12553 | NRRL 3013 |

A representative strain of the genus Streptomyces which is a non-halogenating strain, that is, which will not introduce halogen at the 7-position of the molecule, but which will accomplish the 5a,6- and 4a,12a-dihydration, is S. aureofaciens NRRL 3014. Represesntative strains of the genus Streptomyces which are non-halogenating strains but which will introduce a hydroxy group at the 5-position of the molecule, in addition to accomplishing the 5a,6- and 4a,12a-dihydration, are S. rimosus NRRL 2234, S. platenis NRRL 2364 and S. hygroscopicus NRRL 3015.

The conditions of the fermentation for the biological conversion of the compounds of the present invention to tetracyclines are generally the same as set forth in U.S. Patent 2,482,055 to Duggar, U.S. Patent 2,734,018 to Minieri et al. and U.S. Patent 2,878,289 to McCormick et al. and which, in turn, are generally the same as for the presently known methods for producing various tetracyclines by fermentation. That is, the fermentation medium contains the usual nutrients and mineral substances. Suitable nutrients include any assimilable source of carbon, such as the polysaccharides or starches, or polyalcohols such as glycerol may be used. An assimilable source of nitrogen may be supplied through the use of proteins, protein hydrolysates, urea, corn steep liquor, meat extracts, peptone, distillers solubles, fish meal and other conventional substances. The common anions and cations are supplied in the form of their non-toxic salts. Trace elements such as manganese, cobalt, zinc, copper, etc., are obtained either as impurities in the above compounds, or through the use of tap water or by specifically adding solutions especially enriched with these trace elements.

The other general conditions of the fermentation such as hydrogen ion concentration, temperature, time rate of aeration, preparation of the inoculum, sterilization, inoculation and the like are conventional and are similar to those for the production of other tetracyclines as set forth in the aforementioned U.S. Patents to Duggar, Minieri et al. and McCormick et al.

When a 7-helogenating strain of the genus Streptomyces is employed with a 1,3,4,10,11,12-hexahydroxy-naphthacene-2-carboxamide wherein $R_7$ is hydrogen, it is necessary only to modify the fermentation medium so that it contains at least 10 parts per million of chloride ions when the 7-chloro substituent is desired, or a like amount of bromide ions when the 7-bromo substituent is desired.

After the fermentation has been continued for a suitable time, for example, from 12 to 96 hours, and the transformation of the compound to the desired tetracycline is substantially complete, the tetracycline product may be isolated from the fermentation mash in any convenient manner. The isolation process may be selected from any of the numerous isolation techniques now well known in the art.

The starting material may be added at any desired concentration, although for practical reasons a substrate at a concentration of up to about 10 grams per liter of medium is satisfactory although higher concentrations may be used with some sacrifice in yield. The addition of the starting material may be accomplished in any suitable manner so long as it promotes contact with the biological medium. To this end, it is preferred to add the starting material in a solvent such as dimethylformamide, dimethylacetamide, dimethylsulfoxide, tetramethylenesulfoxide and N-methylpyrrolidone. However, dimethylsulfoxide is preferred and a solution of magnesium acetate in dimethylsulfoxide is the most preferred solvent for the starting material. Solutions of the 1,3,4,10,11,12-hexahydroxynaphthacene-2-carboxamides must be protected from air as the compounds are readily oxidized in solution.

The invention will be described in greater detail in conjunction with the following specific examples.

EXAMPLE 1

*Synthesis of 1,3,4,10,11,12-hexahydroxynaphthacene-2-carboxamide*

A 110 mg. portion of 1,3,4,10,12-pentahydroxynaphthacene-6,11-quinone - 2 - carboxamide, prepared as described in Example 7, U.S. Patent No. 3,074,975 (McCormick and Gardner) was added to 5 ml. of phenol, 2.5 ml. of constant boiling hydriodic acid, and 200 mg. of potassium hypophosphite. The mixture was refluxed for 5 minutes, cooled and the crystalline product was filtetred off, affording 73 mg. of 1,3,4,10,11,12-hexahydroxynaphthacene-2-carboxamide.

EXAMPLE 2

*Biological conversion of 1,3,4,10,11,12-hexahydroxynaphthacene - 2 - carboxamide to 7-chloro-6-demethyltetracycline*

Spores of S. aureofaciens NRRL 3013 were washed from an agar slant with sterile distilled water to form a suspension containing $60$–$80 \times 10^6$ spores per ml. A 0.33 ml. portion of this suspension was used to inoculate an 8 inch test tube containing 8 ml. of a medium prepared according to the following formulation:

| | | |
|---|---|---|
| Sucrose | grams | 30 |
| Ammonium sulfate | do | 2 |
| Calcium carbonate | do | 7 |
| Cornsteep liquor | do | 20 |
| Tap water, q.s. to | milliliters | 1000 |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of the S. aureofaciens was obtained. A fermentation medium of the following compositions was prepared:

| | | |
|---|---|---|
| $(NH_4)_2SO_4$ | grams | 6.7 |
| $CaCO_3$ | do | 9.0 |
| $CoCl_2 \cdot 6H_2O$ | milligrams | 5.0 |
| $NH_4Cl$ | grams | 2.0 |

| | | |
|---|---|---|
| MnSO₄ (70% Technical Grade) | do | 0.10 |
| Cornsteep liquor | do | 25.0 |
| Starch | do | 52.5 |
| Corn flour | do | 14.5 |
| Tap water, q.s. to | milliliters | 1000 |

After sterilization of this medium in an autoclave for 20 minutes at a pressure of 15 pounds per square inch, a 25 ml. portion in a 250 ml. Erlenmeyer flask was inoculated with a 1.0 ml. portion of the *S. aureofaciens* inoculum. The fermentation was carried out at 25° C. for 24 hours on a rotary shaker operating at 180 revolutions per minute. At this time a partially fermented mash of *S. aureofaciens* NRRL 3013 was transferred to an individual flask containing a solution of 5.45 mg. of 1,3,4,10,11,12-hexahydroxynaphthacene-2-carboxamide in 30 mg. of magnesium acetate and 1 ml. of dimethylsulfoxide. The fermentation was then continued on the rotary shaker for an additional 72 hours at 28° C. At this time, analysis of the mash showed the presence of 17 micrograms per ml. of 7-chloro-6-demethyltetracycline. A control flask run in exactly the same manner but omitting the 1,3,4,10,11,12-hexahydroxynaphthacene-2-carboxamide showed no 7-chloro-6-demethyltetracycline.

EXAMPLE 3

*Preparation of 4-dedimethylamino-4-hydroxy-4a,12a-anhydrotetracycline*

A 2.0 gram portion of tetracycline methyl betaine was suspended in 500 ml. of acetonitrile. Nitrogen was bubbled through this suspension for 15 minutes. The suspension was then heated under nitrogen atmosphere to the boiling point of acetonitrile and refluxed for 1½ hours. The heat was then removed and the bubbling of nitrogen was continued for an additional 15 minutes until all of the trimethylamine vapors had been stripped off. An orange crystalline product precipitated upon cooling. This precipitate was collected by filtration, washed with acetonitrile and dried in a vacuum desiccator to afford 100 mg. of product.

EXAMPLE 4

*Conversion of 4-dedimethylamino-4-hydroxy - 4a,12a-anhydrotetracycline to 6-methyl-1,3,4,10,11,12 - hexahydroxynaphthacene-2-carboxamide*

A 100 mg. portion of 4-dedimethylamino-4-hydroxy-4a,12a-anhydrotetracycline was suspended in 15 ml. of a solution of 30% hydrobromic acid in acetic acid. This suspension was heated at 50–55° C. for 3 hours. The suspension was cooled to room temperature and the precipitate was collected by filtration, washed with water and dried in a vacuum desiccator for 16 hours, affording 89 mg. of product.

EXAMPLE 5

*Biological conversion of 6 - methyl-1,3,4,10,11,12-hexahydroxynaphthacene-2-carboxamide to 7 - chlorotetracycline*

Spores of *S. aureofaciens* NRRL 3013 were washed from an agar slant with sterile distilled water to form a suspension containing 60 million to 80 million spores per ml. A 0.33 ml. portion of this suspension was used to inoculate an 8 inch test tube containing 8 ml. of an inoculum prepared as described in Example 2. A fermentation medium of the following composition was prepared:

| | | |
|---|---|---|
| (NH₄)₂SO₄ | grams | 6.7 |
| CaCO₃ | do | 9.0 |
| CoCl₂·6H₂O | milligrams | 5.0 |
| NH₄Cl | grams | 2.0 |
| MnSO₄ (70% Technical Grade) | do | 0.10 |
| Cornsteep liquor | do | 25.0 |
| Starch | do | 52.5 |
| Corn flour | do | 14.5 |
| Tap water, q.s. to | milliliters | 1000 |

After sterilization of this medium, 25 ml. portions in 250 ml. Erlenmeyer flasks were inoculated with 1 ml. portions of the *S. aureofaciens* NRRL 3013 inoculum. The fermentation was carried out at 28° C. for 24 hours on a rotary shaker operating at 180 revolutions per minute. At this time each mash portion was transferred to an individual flask containing a solution of 10.7 mg. of 6-methyl-1,3,4,10,11,12-hexahydroxynaphthacene - 2 - carboxamide in a mixture of 30 mg. of magnesium acetate and 1 ml. of dimethylsulfoxide. The fermentation was continued on the rotary shaker for an additional 96 hours at 28° C. At this time, biological assays of the mash indicated the presence of antibacterial activity corresponding to 264 micrograms of 7-chlorotetracycline per ml. This corresponds to a yield of 49% based on the compound added. The identity of the product as 7-chlorotetracycline was confirmed by paper chromatography in a butanol-pH3 phosphate buffer system. A control flask run in the same manner but with the addition of only 30 mg. of magnesium acetate and 1 ml. of dimethylsulfoxide and no 6-methyl-1,3,4,10,11,12-hexahydroxynaphthacene-2-carboxamide, showed no 7-chlorotetracycline.

EXAMPLE 6

*Preparation of 6-demethyl-7-chlorotetracycline methiodide*

The 6-demethyl-7-chlorotetracycline free base, 3 g., is dissolved in 60 ml. of hot tetrahydrofuran and the solution is filtered. To the filtrate is added 9 ml. of methyl iodide and the mixture is allowed to stand at room temperature for 6 days. A small amount of amorphous precipitate is filtered, washed with ether and dried to afford 396 mg. of product. The filtrate is diluted with about 200 ml. of ether and the light yellow solid is isolated by filtration. Yield: 3.18 g. This material is crystallized from methanol as follows: The solution of 1 g. of product in 4 ml. of methanol is stirred at room temperature for 10 minutes. Crystalline precipitate is filtered and dried in pistol at 62° C. for two hours. This product has the following properties:

$\lambda_{max.}^{0.1N\ HCl}$=228 m$\mu$ [log $\epsilon$ 4.41], 270 m$\mu$ [log $\epsilon$ 4.14], 373 m$\mu$ [log $\epsilon$ 4.03]

$\lambda_{max.}^{0.1M\ Borate}$=225 m$\mu$ [log $\epsilon$ 4.41], 290 m$\mu$ [log $\epsilon$ 4.09], 375 m$\mu$ [log $\epsilon$ 4.20]

EXAMPLE 7

*Preparation of 6-demethyl-7-chlorotetracycline methyl betaine*

The 6-demethyl-7-chlorotetracycline methiodide, 200 mg., is dissolved in 5 ml. of water. The solution is adjusted immediately to pH 6.8 with a few drops of 20% sodium acetate solution. One ml. of methanol is added to get the precipitated solid into solution which is then stirred for 10 minutes at room temperature. Methanol is stripped off under vacuum and the crystalline product which precipitates from water is filtered and dried at 62° C. overnight to afford 143 mg. of product.

EXAMPLE 8

*Preparation of 4-dedimethylamino-4-hydroxy-4a,12a-anhydro-6-demethyl-7-chlorotetracycline*

The 6-demethyl-7-chlorotetracycline betaine, 3 g., is suspended in 500 ml. of acetonitrile and nitrogen is bubbled through for 15 minutes. The suspension is then heated under nitrogen atmosphere to the boiling point of acetonitrile and refluxed for 4 hours. A small amount of solid does not go in solution. Heat is removed and bubbling of nitrogen is continued until most of the trimethylamine vapors are stripped off (about 10 minutes). The undissolved material is filtered. The filtrate is evaporated to dryness to afford 2.1 g. of a mixture which is purified as follows: 1.5 g. of this material is dissolved in 500 ml. of methanol. A yellow product crystallizes out within a few minutes. It is allowed to stand at room temperature for one hour and then filtered. It is washed well with ether and dried in pistol at 62° C. Yield: 381 mg.

$\lambda_{max.}^{0.1N\ HCl} = 285\ m\mu$ [log $\epsilon$ 3.86], 400 m$\mu$ [log $\epsilon$ 4.05]

$\lambda_{max.}^{0.1M\ Borate} = 255\ m\mu$ [log $\epsilon$ 4.20], 458 m$\mu$ [log $\epsilon$ 4.29]

EXAMPLE 9

*Preparation of 7-chloro-1,3,4,10,11,12-hexahydroxy-naphthacene-2-carboxamide*

The 4-dedimethylamino - 4-hydroxy-4a,12a-anhydro-6-demethyl-7-chlorotetracycline, 60 mg., is stirred in 4 ml. of a solution of 32% HBr in acetic acid for 5 minutes. It is then evaporated to dryness under vacuum. The residue is received in ether, filtered and dried in vacuo to afford 58 mg. of product analyzing as follows:

$\lambda_{max.}^{conc.\ H_2SO_4/1\%\ borate} = 285\ m\mu$ [log $\epsilon$ 4.22], 318 m$\mu$ [log $\epsilon$ 4.61], 481 m$\mu$ [log $\epsilon$ 4.16], 534 m$\mu$ [log $\epsilon$ 3.96]

EXAMPLE 10

*Preparation of 4-dedimethylamino-4-hydroxy-4a,12a-anhydro-7-chlorotetracycline*

The 7-chlorotetracycline methyl betaine, 3.44 g., is suspended in 630 ml. of acetonitrile and nitrogen is bubbled through for 15 minutes. The suspension is then heated under nitrogen atmosphere to the boiling point of acetonitrile and the resulting solution is refluxed for one and a half hour. Heat is removed and bubbling of nitrogen is continued until most of trimethylamine vapors are stripped off (about 10 minutes). A small amount of solid precipitates out upon cooling which is filtered off. The filtrate is evaporated to dryness. Solid is received in 500 ml. of ether and refluxed for 30 minutes. Undissolved solid is filtered (1.713 g.). Filtrate which contains the desired products is evaporated to dryness (wt.=1.192 g.) and purified by partition column chromatography using the system: heptane-ethyl acetate-methanol-water (80–20–17–4). The product is obtained in two tautomeric forms which give the same ultraviolet spectra in 0.1N HCl as follows: $\lambda_{max.}$ 250 m$\mu$ [log $\epsilon$ 4.32], 362 m$\mu$ [log $\epsilon$ 3.90].

EXAMPLE 11

*Preparation of 7-chloro-6-methyl-1,3,4,10,11,12-hexahydroxynaphthacene-2-carboxamide*

The 4 - dedimethylamino-4-hydroxy-4a,12a-anhydro-7-chlorotetracycline, 20 mg., is dissolved in 4 ml. of a solution of 32% hydrobromic acid in acetic acid and the red solution is evaporated immediately to dryness under vacuum. The solid is received in ether, filtered and dried in vacuo to afford 16.7 mg. of product analyzing as follows: $\lambda_{max.}$ = 270 [log $\epsilon$ 4.32], 310 [log $\epsilon$ 4.39], 508 [log $\epsilon$ 3.98]. The spectrum is taken in concentrated $H_2SO_4$ containing 1% sodium borate.

EXAMPLE 12

*Biological conversion of 7-chloro-6-methyl-1,3,4,10,11,12-hexahydroxynaphthacene-2-carboxamide to 7-chlorotetracycline utilizing a non-chlorinating strain of S. aureofaciens*

Spores of non-chlorinating *S. aureofaciens* NRRL 3014 were washed from an agar slant with sterile distilled water to form a suspension containing 60–80×10⁶ spores per ml. A 0.33 ml. portion of this suspension was used to inoculate an 8 inch test tube containing 8 ml. of a medium prepared according to the following formulation:

| | | |
|---|---|---|
| Sucrose | grams | 30 |
| Ammonium sulfate | do | 2 |
| Calcium carbonate | do | 7 |
| Cornsteep liquor | do | 20 |
| Tap water, q.s. to | milliliters | 1000 |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute whereby an inoculum of the *S. aureofaciens* was obtained. A fermenation medium of the following composition was prepared.

| | | |
|---|---|---|
| $(NH_4)_2SO_4$ | grams | 6.7 |
| $CaCO_3$ | do | 9.0 |
| $CoCl_2 \cdot 6H_2O$ | milligrams | 5.0 |
| $NH_2Cl$ | grams | 2.0 |
| $MnSO_4$ (70% Technical Grade) | do | 0.10 |
| Cornsteep liquor | do | 25.0 |
| Starch | do | 52.5 |
| Corn flour | do | 14.5 |
| Tap water, q.s. to | milliliters | 1000 |

After sterilization of this medium in an autoclave for 20 minutes at a pressure of 15 pounds per square inch, 25 ml. portions in 250 ml. Erlenmeyer flasks were inoculated with 1.0 ml. portions of the *S. aureofaciens* inoculum. The fermentation was carried out at 25° C. for 24 hours on a rotary shaker operating at 180 revolutions per minute. At this time each mash portion was transferred to an individual flask containing a solution of 10 mg. of 7-chloro-6-methyl - 1,3,4,10,11,12 - hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time analysis of the mash showed the presence of 10 micrograms per ml. of 7-chlorotetracycline. A control flask run in exactly the same manner but omitting the 7-chloro-6-methyl-1,3,4,10,11,12-hexahydroxynaphthacene-2-carboxamide showed no 7-chlorotetracycline.

EXAMPLE 13

*Biological conversion of 7-chloro-1,3,4,10,11,12-hexahydroxynaphthacene-2-carboxamide to 7-chloro-6-demethyltetracycline utilizing a non-chlorinating strain of S. aureofaciens*

The procedure of Example 12 was followed with these exceptions: The partially fermented (24 hour) mash was transferred to flasks containing a solution of 10 mg. of 7-chloro-1,3,4,10,11,12 - hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time, analysis of the mash showed the presence of 9 micrograms per ml. of 7-chloro-6-demethyltetracycline. A control flask run in exactly the same manner but omitting the 7-chloro-1,3,4,10,11,12-hexahydroxynaphthacene-2-carboxamide showed no 7-chloro-6-demethyltetracycline.

EXAMPLE 14

*Biological conversion of 7-chloro-6-methyl-1,3,4,10,11,12-hexahydroxynaphthacene-2-carboxamide to 7-chlorotetracycline utilizing a chlorinating strain of S. aureofaciens*

The procedure of Example 12 was followed with these exceptions: Spores of chlorinating *S. aureofaciens* NRRL 3013 were washed from an agar slant with sterile distilled water to form a suspension containing 60–80×10⁶ spores per ml. A 0.33 ml. portion of this suspension was used to inoculate an 8 inch test tube containing 8 ml. of the medium described in Example 12. The partially fermented (24 hour) mash (prepared as in Example 12) was transferred to flasks containing a solution of 10 mg. of 7-chloro-6-methyl-1,3,4,10,11,12 - hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time, analysis of the mash showed the presence of 10 micrograms per ml. of 7-chlorotetracycline. A control flask run in exactly the same manner but omitting the 7-chloro-6-methyl - 1,3,4,10,11,12 - hexahydroxynaphthacene-2-carboxamide showed no 7-chlorotetracycline.

EXAMPLE 15

*Biological conversion of 7-chloro-1,3,4,10,11,12-hexahydroxynaphthacene-2 - carboxamide to 7-chloro-6-demethyltetracycline utilizing a chlorinating strain S. aureofaciens*

The procedure of Example 14 was followed with these exceptions: The partially fermented (24 hour) mash was transferred to flasks containing a solution of 10 mg. of 7 - chloro-1,3,4,10,11,12 - hexahydroxynaphthacene-2-carboxamide in a mixture of 10 mg. of magnesium acetate and 1 ml. of dimethylsulfoxide. The fermentation was then continued on the rotary shaker for an additonal 96 hours at 28° C. At this time analysis of the mash showed the presence of 9 micrograms per ml. of 7-chloro-6-demethyltetracycline. A control flask run in exactly the same manner but omitting the 7-chloro-1,3,4,10,11,12-hexahydroxynaphthacene-2-carboxamide showed no 7-chloro-6-demethyltetracycline.

What is claimed is:

1. A compound of the formula:

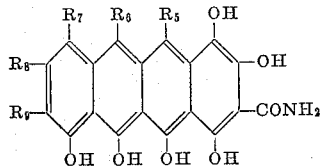

wherein $R_5$ is selected from the group consisting of hydrogen and lower alkyl, $R_6$ is selected from the group consisting of hydrogen and lower alkyl, and $R_7$, $R_8$ and $R_9$ are each selected from the group consisting of hydrogen, halogen, hydroxy, lower alkoxy, lower alkyl, amino, mono(lower alkyl)amino, di(lower alkyl)amino, nitro, nitroso, thiocyano and mercapto.

2. A compound of the formula:

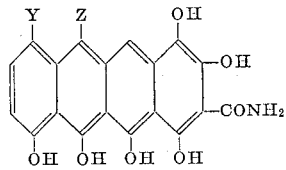

wherein Z is selected from the group consisting of hydrogen and lower alkyl, and Y is selected from the group consisting of hydrogen, chlorine and bromine.

3. 1,3,4,10,11,12 - hexahydroxynaphthacene-2-carboxamide.

4. 6 - methyl-1,3,4,10,11,12-hexahydroxynaphthacene-2-carboxamide.

5. 7 - chloro-1,3,4,10,11,12 - hexahydroxynaphthacene-2-carboxamide.

6. 7 - chloro-6-methyl-1,3,4,10,11,12 - hexahydroxynaphthacene-2-carboxamide.

7. 7 - bromo-1,3,4,10,11,12-hexahydroxynaphthacene-2-carboxamide.

8. 7 - bromo-6-methyl-1,3,4,10,11,12-hexahydroxynaphthacene-2-carboxamide.

References Cited

FOREIGN PATENTS 1,090,205   10/1960   Germany.

NICHOLAS S. RIZZO, *Primary Examiner.*